(12) United States Patent
Murphy et al.

(10) Patent No.: US 8,065,330 B2
(45) Date of Patent: Nov. 22, 2011

(54) INFORMATION MANAGEMENT AND ENTERTAINMENT SYSTEM

(75) Inventors: Enda Murphy, County Cork (IE); Patrick O'Donnell, Cork (IE)

(73) Assignee: Lincor Solutions Limited, Cork (IE)

( * ) Notice: Subject to any disclaimer, the term of this patent is extended or adjusted under 35 U.S.C. 154(b) by 1001 days.

(21) Appl. No.: 11/919,553

(22) PCT Filed: May 3, 2006

(86) PCT No.: PCT/IE2006/000045
§ 371 (c)(1),
(2), (4) Date: Oct. 30, 2007

(87) PCT Pub. No.: WO2006/117768
PCT Pub. Date: Nov. 9, 2006

(65) Prior Publication Data
US 2010/0017437 A1    Jan. 21, 2010

(30) Foreign Application Priority Data
May 3, 2005   (IE) ...................................... 2005/0270

(51) Int. Cl.
*G06F 7/00* (2006.01)
(52) U.S. Cl. ........ 707/783; 707/636; 707/655; 707/825; 715/229; 709/201
(58) Field of Classification Search .................... 707/783
See application file for complete search history.

(56) References Cited

U.S. PATENT DOCUMENTS

| | | | | |
|---|---|---|---|---|
| 2002/0124182 A1* | 9/2002 | Bacso et al. | .................. | 713/200 |
| 2003/0043985 A1* | 3/2003 | Wu | .......................... | 379/144.05 |
| 2003/0076815 A1* | 4/2003 | Miller et al. | .................. | 370/352 |
| 2005/0078170 A1* | 4/2005 | Firestone et al. | .......... | 348/14.08 |

FOREIGN PATENT DOCUMENTS

| | | |
|---|---|---|
| EP | 1 191 724 | 3/2002 |
| FR | 2 760 158 | 8/1998 |
| GB | 2 384 412 | 7/2003 |
| GB | 2 407 891 | 5/2005 |
| WO | 98/47112 | 10/1998 |
| WO | 01/08055 | 2/2001 |
| WO | 01/16900 | 3/2001 |

* cited by examiner

*Primary Examiner* — Shahid Alam
*Assistant Examiner* — Fazlul Quader
(74) *Attorney, Agent, or Firm* — Jacobson Holman PLLC

(57) ABSTRACT

An information management and entertainment system (1) comprises user terminals (2), and a switching system (5, 40-43) having interfaces (21, 23, 31) for receiving media streams and for routing the streams to the terminals. The system (1) comprises at least one management server (15) for routing control signals to components of the system. The server (15) and the terminals (2) execute a middleware engine (65, 70) for communication within the system. The middleware engine comprises a services processor (65) executing on a server (15) and functions executing on the terminals (2) for controlling provision of information management and entertainment services to users via the terminals (2). The system further comprises at least one vending machine (16) for vending user cards for usage of services. The vending machine (16) writes a unique user identifier to each card, each terminal comprises a card reader, and the terminal (2) middleware functions receive and validate a card and allow provision of services upon validation of a card. The terminal middleware functions allow provision of services up to a limit set by a credit amount read from a card. The vending machine (16) writes the user identifier comprising a component having a card factory-set identifier and a component freshly-generated upon issuance of the card. The freshly-generated component is a value which is incremented from a previous value, and said value is not used again by the system.

19 Claims, 3 Drawing Sheets

INFORMATION MANAGEMENT AND ENTERTAINMENT SYSTEM

This is a national stage of PCT/IE2006/000045 filed May 3, 2006.

FIELD OF THE INVENTION

The invention relates to an information and entertainment system for use by, for example, patients and clinicians in a hospital.

PRIOR ART DISCUSSION

GB2384412 (Vortex Communications Limited) and GB2407891 (The Wandworth Group Limited) describe systems in which terminals are used for a variety of information and entertainment services including television, telephone, internet, medical record access, and patient feedback services. Access to services is achieved using a card or key.

While there has been much development of hardware resources for such systems, there is a need to achieve improved versatility in terms of the range of information and entertainment services which can be provided. For example, the challenges faced in providing entertainment services (such as TV) is generally not compatible with clinicians interfacing with medical records using the same equipment because of the huge difference in data security requirements.

The invention is therefore directed towards providing an improved system having an interface for receiving diverse entertainment feed streams, an interface to extensive databases of high-security data such as medial records, and multiple terminals the users of which change frequently.

SUMMARY OF THE INVENTION

According to the invention, there is provided an information management and entertainment system comprising a plurality of user terminals, and a switching system having interfaces for receiving media streams and for routing the streams to the terminals, characterized in that:
  the system comprises at least one management server for routing control signals to components of the system,
  the server and the terminals execute a middleware engine for communication within the system, and
  the middleware engine comprises a services processor executing on a server and functions executing on the terminals for controlling provision of information management and entertainment services to users via the terminals.

In one embodiment, the system further comprises at least one vending machine for vending user cards for usage of services, wherein the vending machine writes a unique user identifier to each card, wherein each terminal comprises a card reader, wherein the terminal middleware functions receive and validate a card and allow provision of services upon validation of a card.

In one embodiment, the services processor automatically accesses data in an external database to verify a card.

In one embodiment, the terminal middleware functions allow provision of services up to a limit set by a credit amount read from a card.

In one embodiment, the vending machine writes the user identifier comprising a component having a card factory-set identifier and a component freshly-generated upon issuance of the card.

In one embodiment, the freshly-generated component is a value which is incremented from a previous value, and said value is not used again by the system.

In one embodiment, the vending machine comprises a receiver for receiving used cards, and a card issuer for re-issuing said cards with a different user identifiers.

In another embodiment, the services processor automatically terminates a user on the system upon return of the user's card.

In one embodiment, the services processor automatically terminates a user upon polling an external database of user data and if said external database indicates that the user should be terminated.

In one embodiment, the middleware engine services processor comprises a function executing on each terminal for validating a presented card, functions executing on the server and on the terminal for prompting input of user profile data to establish a user profile upon first presentation of a card, and middleware engine server functions identify the user by the card identifier.

In a further embodiment, the middleware engine services processor automatically maintains a transaction database, each record of which relates to a user service transaction.

In one embodiment, the middleware engine services processor automatically maintains a vendor log database, each record of which relates to a transaction involving a card vending machine, including a credit amount read from the card.

In one embodiment, the middleware engine services processor dynamically manages service provision to the terminals according to real time updating of the transaction and vendor log databases, writing of fresh records to these databases allowing provision of fresh services after validation by the middleware engine with reference to the user profile database.

In one embodiment, the middleware engine comprises a secure data processor having a function on each terminal for authorising access by a person having high-security access, and functions executing on the server for allowing access to high-security data upon authorization by a terminal.

In one embodiment, said secure data processor limits high-security data access to database records associated with a user linked with the terminal (2) which receives the high-security data access request.

In one embodiment, the secure data processor determines said linking by verifying an association between a user and a terminal.

In one embodiment, said verification is performed by reference to the user profile database.

In one embodiment, the secure data processor validates a high-security card presented to a card reader in the terminal.

In one embodiment, the services processor comprises update functions executing on the terminals and on the vending machines, and said update functions automatically transmit live status updates to services processor functions executing on the server, and said functions log the updates.

In one embodiment, the updates are triggered according to time and according to service transaction or card vending events.

In one embodiment, the server-executing functions automatically parse the update to determine update data.

In one embodiment, server-executing functions use the updates to verify user-requested transactions.

In one embodiment, the services processor functions communicate within the system using the http protocol.

In one embodiment, the switching system comprises a local area network core switch and local area network edge switches linked with the terminals.

In one embodiment, the local area network core switch is connected to a TV head-end, in turn linked with broadcast networks, and said core switch is also connected to a VoIP gateway.

In one embodiment, the VoIP gateway is connected to an integrated voice response system.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

System Overview

Figure 1:
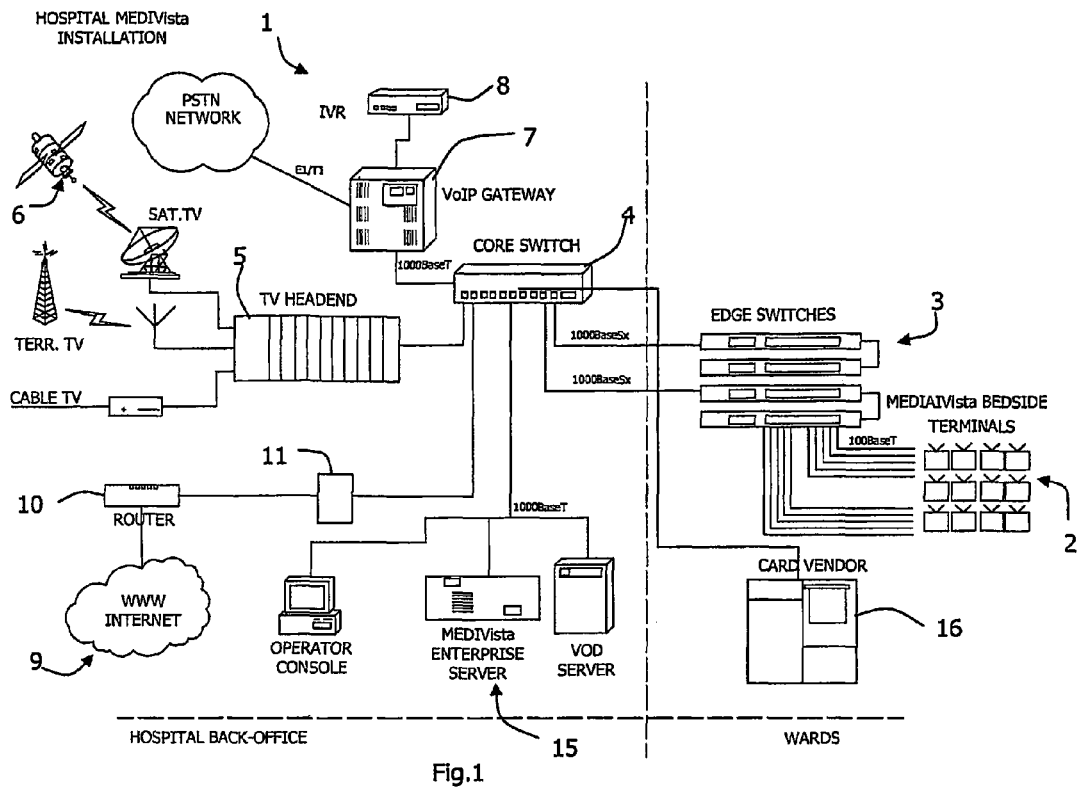
FIG. 1 is a block diagram of an information management and entertainment system of the invention.

Referring to FIG. 1 an entertainment system 1 comprises multiple patient terminals 2 connected by 100 BaseT cabling to local area network (LAN) edge switches 3, in turn connected to a LAN core switch 4. The LAN core switch 4 receives TV media inputs from a TV head-end 5, in turn receiving the media from various terrestrial and satellite sources 6. Also, a VoIP gateway 7 feeds voice to the LAN core switch 4, in turn receiving the voice signals from an IVR system 8 and a PSTN network. Internet access is via a router 10 and a firewall 11.

The system 1 further comprises a bank of enterprise servers 15, and smart card vending machines 16. There are multiple servers 15, interconnected for modular expansion and for redundancy. Also, while for clarity only one smart card vending machine 16 is shown, there are a number of vending machines 16 interconnected in a local area network at convenient locations in a hospital.

Each patient terminal 2 has a touch flat-screen configuration, is mounted on a swivel arm, and incorporates a processor, a telephone handset, and a smart card reader. The processor executes middleware functions as described below.

The system 1 in this embodiment provides the following services:

Television (multiple channels, some digital IPTC protocol, some analog, and some encrypted).
Digital radio.
Internet Access—general purpose internet browsing with content filtering
Films on demand (VOD services)
Audio books
Games.
Telephone calls in/out
Hospital Information pages
Electronic Patient Records
Electronic patient meal ordering
Employee tracking
Online shopping These services are not an exhaustive list and a system of other embodiments may provide fewer or more services. An advantageous aspect of the invention is that a middleware engine executing on the servers 15, the terminals 2, and the vending machines 16 allows excellent versatility for real time modification of the range of services for any particular installation.

As illustrated in FIG. 1 the TV signals are received from any desired source, including digital satellite (DVB-S), digital terrestrial (DVB-T), or digital cable (DVB-C) sources. These signals are fed to the TV head-end 5 which receives, demodulates and streams the selected programs to the terminals 2 via the local area network. All of the TV signals are delivered using TV over IP multicasting technology.

Figure 2:
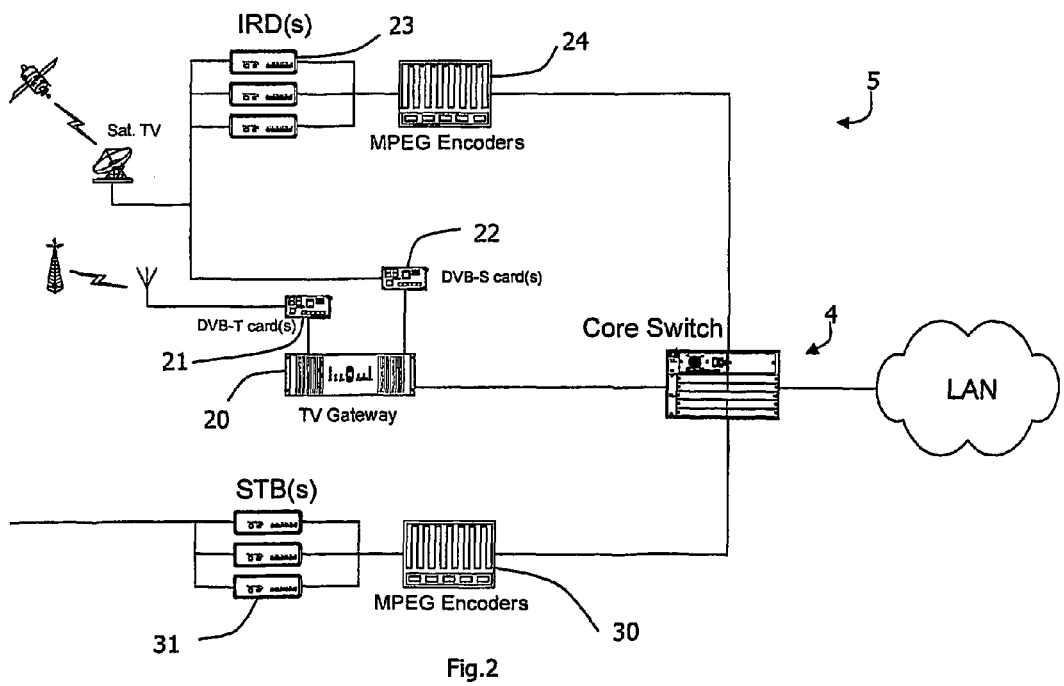
FIG. 2 is a block diagram of a TV head-end part of the system.

Referring to FIG. 2, the method of reception and decoding of the TV programs is determined by which source they are transmitted from and if they require a conditional access system to decode them (i.e. are the signals scrambled). If the TV programs are transmitted in the clear, the signals (from DVB-S and DVB-T) are fed directly to an IPTV gateway 20. This is configured with the appropriate number of DVB-S 22 and DVB-T 21 PCI receiver cards depending on the configuration. Each card has the ability to tune into a single multiplex of programs. The IPTV gateway 20 is programmed to remove the appropriate TV programs from the multi-program transport stream being transmitted by the TV broadcaster and to repackage the selected programs into single-program transport streams. These single-program transport streams are then multi-casted on the LAN for reception by the terminals 2.

If the program to be received is scrambled prior to transmission, a conditional access decoder (with smart card authorization) is required to decode the program stream before re-transmission on the LAN. As many different types of conditional access exist, the system 1 employs IRDs (Integrated Receiver Decoders) 23 and set-top boxes 31. As the output of the IRDS 23 and set-top boxes 31 is generally analog video and audio, it is necessary to re-encode these channels into MPEG-2 format for re-transmission over the LAN. MPEG encoders 30 perform this function. These re-encoded single-program transport streams are multi-casted on the LAN together with those program streams from the IPTV gateway 20. Reception of cable TV programs are dealt with in the same way as the conditional access channels.

The LAN uses IGMP-aware network switches to ensure minimal traffic on each node of the network.

Figure 3:
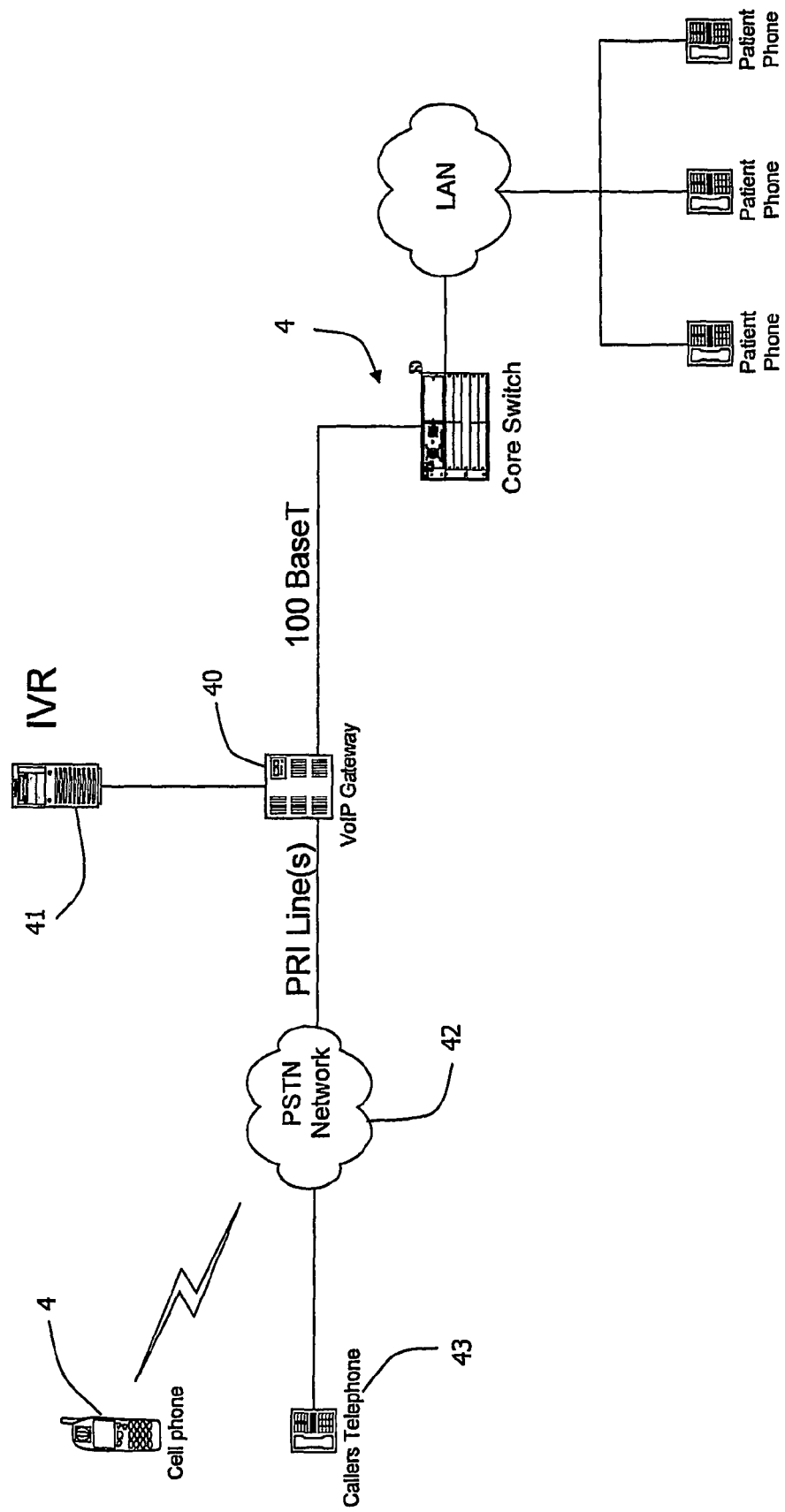
FIG. 3 is a block diagram of a VoIP telephony part of the system.

The telephony system employs the VoIP (Voice over IP) protocol. The architecture of the telephony system is shown in FIG. 3. A VoIP gateway 40 is a SIP-based gateway that facilitates the conversion of SIP-based telephone calls to PSTN standards. Session Initiation Protocol (SIP) is a signalling standard suitable for handling converged communication.

An IVR (Integrated Voice Receiver) 41 acts as an automated attendant, automatically giving voice prompts to the caller to determine how to route the telephone call. This is primarily used during inbound telephone calls where the caller wishes to connect to a particular telephone extension number (patient terminal). The IVR 41 automatically answers the call and prompts the user for the desired extension number. The caller, using a terminal 2, dials the extension number using DTMF tones on their phone handset on the terminal. The IVR detects these DTMF tones and passes this information to the SIP gateway 40, which routes the call through to the correct destination. The PSTN 42 connections to the VoIP gateway 40 are PRI-30 telephone lines, the exact number required depending on the size and configuration of the installation.

Within the system 1 the main software execution platforms are the terminals 2, the servers 15, and the vending machines 16. The middleware engine executing on the servers 15 and the terminals 2 controls and monitors the information being transmitted, performs diagnostics, and monitors terminal 2 usage. It uses the core switch 4 as a hub for control and monitoring, the core switch 4 linking the entertainment and information services streams to the edge switches 3, in turn routing them to the terminals 2. There is bi-directional communication between the terminals 2 and the servers 15 and uni-directional communication between the servers 15 and the core switch 4 for control purposes.

The middleware engine handles the real time data streaming requirements across the wide variety of components of the system 1, including all terminals 2. This achieves uniform messaging for routing and other control purposes.

Vending Machine Operation and User Tracking

The vending machines 16 communicate with the servers 15 so that there can be full verification of all transactions requested at the vending machines 16. For example, a request for a refund for unused services accessed by use of a smart card involves a number of verification cycles. Such a cycle may involve an analysis of part usage pattern of the card and/or of particular services. The servers 15 also manage traffic to optimise off-peak usage of processing and communication resources within the system 1.

Regarding use of the vending machines 16, each card has a unique code, which code is automatically incremented with each transaction for purchase of services. This fresh code is stored on the card. The code comprises the unique factory-set code of the card and an addendum code. Thus, when a patient leaves the hospital and returns the card to a vending machine in return for a deposit refund the card is stored in the machine 16. This card will subsequently be re-issued to a fresh patient arriving in the hospital, this time with a code comprising the factory-set code and a fresh addendum, the combination being unique both at that time and across all historical use of the system 1. This code is the user code as far as the system 1 is concerned, and database user keys include this card code.

In more detail, each smart card has a unique 10 digit serial number programmed onto the card at the time of manufacture. The vending machine 16 appends a 6 digit number to the start of this serial number when it dispenses a card. Therefore the full serial number is as follows,

XXXXXXXXXXYYYYYY where X represents the 10 digit hard coded serial number programmed at the time of card manufacture (and cannot be changed) and YYYYYY represents the serial number appended by the smart card vending machine. This YYYYYY serial number is incremented by one each time that a smart card is recycled through the vending machine, thus ensuring that the same serial number is never used twice in the system. It also facilitates the operator of the system to monitor how many times these smart cards are being recycled through the vending machines 16.

When a user purchases a smart card from the machine 16, the new serial number is generated on the card. When the user inserts this card into a terminal, a user database is checked to see if a record matching this serial number exists. If not, a new record is generated for this card (user). This is generated by the terminal prompting user input of profile data. The middleware engine automatically cross-checks the user profile data against the external hospital records. Thus, by input of a valid freshly-issued card, input of profile data, and cross-checking of the profile data against the external records there is comprehensive authentication of a user. If further security is required, the terminal may be programmed to require input of a supervisor security code to allow the profile data to be inputted. The terminals 2 interface directly with the external databases to interrogate them, after initially notifying the server-based middleware functions.

System Status Monitoring

The terminals 2 and the vending machines 16 regularly (once per minute) send out status information about themselves. This data gives live status information regarding status of the system components, and historical information regarding the usage of various services on the terminals by storing the information and data mining the results. With appropriate data monitoring, the system status data can help prevent problems from occurring, for example monitoring the cash levels in the vendor or monitoring storage disk usage on the terminals.

"Termon" is a dedicated client-server middleware function executing on each terminal 2 and on each vending machine 16, and which reports status data to a server 15, which stores the data in a database. The corresponding server middleware function runs continuously on the server 15 and listens on a port for UDP packets coming from the machines 16 and terminals 2 on the network. When a packet arrives it is parsed, verified, and then written to the database. All data is stored in one large table for post-processing and some important data is also written to smaller tables for immediate access. The client-side function runs each minute. It collects the required pieces of information from the machine or terminal and builds a UDP packet with them. The packet has a very simple structure, the order of the fields is strictly defined and they are separated with new lines. This simplifies the parsing required at the server side and reduces server load. It also means that thousands of packets can still be reliably collected every minute even when the server is under heavy load from other tasks. The client function can also be triggered by certain key events taking place, such as when the phone handset is lifted, when a smart card is inserted, or if the user attempts to purchase a service but has insufficient credit to do so.

The table below lists each of the segments of data that are included in the termon data packet. Different packets are sent by the vendors and these are indicated also. When the termon data has been received and processed, it is stored in a termon database as shown below.

| Field Name | Description | Terminal | Vendor |
|---|---|---|---|
| mac | MAC address of primary NIC | yes | yes |
| build | Lincor build number, e.g. 20060201512 | yes | yes |
| card_id | ID number of inserted smart card | yes | no |
| credit | Available credit on inserted smart card | yes | no |
| case_temp | Ambient internal temperature in Celsius | yes | yes |
| cpu_temp | CPU temperature in Celsius | yes | yes |
| hdc1_pc | % disk usage on disk partition 1 | yes | yes |
| hdc6_pc | % disk usage on disk partition 6 | yes | yes |
| hdc7_pc | % disk usage on disk partition 7 | yes | yes |
| ipaddr | IPv4 address of primary NIC | yes | yes |
| spare | spare field. unused. | no | no |
| load1 | average system load over the last minute | yes | yes |
| load5 | average system load over the last 5 mins | yes | yes |
| load15 | average system load over the last 15 mins | yes | yes |
| memtotal | Total memory in system (KB) | yes | yes |
| memused | Used memory in system (KB) | yes | yes |
| type | "terminal" or "vendor" | yes | yes |
| memfree | Free, unused memory (KB) | yes | yes |
| timestamp | Unix epoch timestamp of data packet | yes | yes |
| previous_uri | Previous URI loaded by browser | yes | no |
| current_uri | Current URI loaded by browser | yes | no |
| change10_avail | 10 cent coins in hopper | no | yes |

-continued

| Field Name | Description | Terminal | Vendor |
|---|---|---|---|
| change100_avail | 100 cent coins in hopper | no | yes |
| cards_avail | Blank cards in hopper | no | yes |
| outoforder | Out Of Order | no | yes |
| paperlow | Receipt roll at <25% | no | yes |
| nopaper | Receipt roll empty | no | yes |
| changelow | change below danger mark | no | no |
| nocards | No blank cards available | no | yes |
| dooropen | Service door open | no | yes |
| magicbutton | Magic button pressed | no | yes |
| staticdatacount | Reported data unchanged for X minutes | yes | yes |

Database Structure and Server Interaction

The main database of the servers 15 includes the following tables.

Vend_Log Table

This is where all vendor transactions are logged.

| | |
|---|---|
| date | Date and time that the transaction was logged. |
| vendor_id | The assigned site-specific ID assigned to a vending machine when it is commissioned. |
| vendor_transaction | The identifier ID of the transaction that will correspond to the logged transaction. |
| type | The transaction type describes and identifies the transaction that is recorded in both the vendor log and the server database vend_log table. |
| card_id | The unique card ID, made up of the manufacturer ID and the usage counter, as described above. This provides a unique card_id whenever a card is vended. |
| cash_taken | The amount that was put into the vending machine through the coin mechanism and the note mechanism. |
| cash_paid | The value of the coins returned through the coin hoppers to the patient either as a result of overpayment, a cancelled transaction or because of the refund. |
| credit_note_value | The value of any credit note issue to a patient when insufficient coins were available. |
| donation_value | The amount that was donated by the patient from a refunded card. |
| card_value_added | The value that has been credited to the card. |
| card_value_taken | The value of credit that has been removed from the card due to a refund. |

Card_Ticket Table

This is a table that logs transactions, "tickets", to cards. This table holds duplicate data to the ticket table.

| | |
|---|---|
| ticket_id | Unique ID for the ticket assigned by the database when the entry is made. |
| card_id | The card_id to which the ticket is attached. |
| uri | The service that is being bought. |
| start | The start time of the service. |
| duration | The duration for which the ticket is valid. |
| rate | The cost of the service. |
| charge_type | The type of charge applied. |

Card Table

The Table that Holds Card Registration Details.

| | |
|---|---|
| card_id | The unique ID of the card |
| date_first_used | The data and time of the card was first entered into the terminal. |

Card_User Table

This table is used to map the smart card to the user_id, the value used internally in the database to identify a set of transactions.

| | |
|---|---|
| card_id | The unique ID of the card |
| user_id | A unique ID for the user of the card assigned by the database. |

Bed_User Table:

This table is used to hold a mapping between the bed the patient is in and the user_id which identifies the set of transactions. It is a specific example for a hospital installation. More generally, this table associates terminals with user identifiers.

| | |
|---|---|
| bed_id | A bed ID as defined when a terminal is commissioned and input at that point into the database |
| user_id | A unique ID for the user of the card assigned by the database. |

User Table

The user table is used to store the profile information about the users. It is not updated as frequently as those tables which record transaction data, and should be regarded as static during the time duration of a particular user being active on the system 1, in this installation the time duration of a patient being in the hospital.

| | |
|---|---|
| user_id | The database primary key for a user as described and assigned above. |
| surname | Surname of a patient. |
| forename | Forename of a patient |
| date_of_birth | Date of birth of a patient. |
| date_of_registration | Date the user was first registered in the database. |
| do_not_disturb | A flag to indicate that a patient should not be disturbed |
| busy | The patient is busy, not used. |
| parental_guidance | Classification of the patient for service delivery. |
| pin_number | Not used in this embodiment |
| ddi_number | The analog or digital telephone number and extension for the user. |
| gone_home | Notification that the patient is no longer in the hospital. |

Ticket Table

All current valid tickets are entered in the ticket table. When a ticket is bought (credit purchased on a card using a vending machine 16) on a terminal this table is updated with the pertinent information.

| | |
|---|---|
| ticket_id | Unique ID for the ticket assigned by the database when the entry is made. |
| user_id | The user_id to which the ticket is attached. |
| uri | The service that is being bought. |
| start | The start time of the service. |
| duration | The duration for which the ticket is valid. |
| rate | The cost of the service. |
| charge_type | The type of charge applied, generally a ticket. |

Old_Ticket Table

Invalid out-of-data tickets are moved to the old ticket table by a process run once daily on the server.

| | |
|---|---|
| ticket_id | Unique ID for the ticket assigned by the database when the entry is made. |
| user_id | The user_id to which the ticket is attached. |
| uri | The service that is being bought. |
| start | The start time of the service. |
| duration | The duration for which the ticket is valid. |
| rate | The cost of the service. |
| charge_type | The type |

Ticket_Log Table

This is a log of all tickets old and new. It is a view of the ticket data and holds no extra information. It is not used by any verification or validation process, it is used for logging purposes only.

Bed Table

The bed table is populated when a system is commissioned. The data is used to identify and describe a particular bedside terminal.

| | |
|---|---|
| bed_id | This is the assigned bed_id for |
| bed_number | An external reference to a bedside terminal configuration database. |
| phone_extension | The phone extension of the bedside terminal. |
| ward_id | The ward identification. |

The vending machines 16 use the http protocol to access the server database. A http "get request" is sent to a PHP page on the server. This page has write access to the database and the following fields are written into the vendor log table in the database when a transaction on the vendor has finished:

The transaction type describes and identifies the transaction that is recorded in both the vending machine log and the server database vend log table. The type will be one of the following:

| | |
|---|---|
| sale | A new card ID, made up of the manufacture ID and the usage number, is created that has a defined credit value. |
| topup | A valid card ID has had its credit added to by a defined amount. |
| refund | A valid card ID has had all its credit refunded to the patient and the card id is now no longer valid. |
| donate | A valid card ID has had all its credit donated by the patient and the card ID is now no longer valid. |
| drain | A vendor has had its hopper drained of coins by a service person. |
| nosale | A cancelled transaction took place, a card ID may have been provided if available. |

If the server 15 is not available then the vending machine 16 will not allow any transactions to take place. This is achieved using an asynchronous process that actively polls the network for the server and if no response to the poll is achieved then the server is assumed to be unavailable and the vending machine 16 goes off-line and becomes "Out of service" for patient transactions. There is also an independent usage log on each vending machine 16 that can be used to reconstruct any "lost" transactions. The usage log should match the data written to the database on the server.

After a patient buys a card with credit they can use the credit electronically stored on the card to buy "tickets" for services provided by a terminal at their bedside. Services like television, Internet access, telephone call time and movies can be purchased. The ticket is only valid for the card that was used to purchase it. The card that purchased a ticket must be present, inserted into the terminal, to allow the patient to access the service. Multiple tickets can be purchased by a patient. They may have a 24 hour ticket to watch TV, a ticket to view a movie and be on a telephone call all at the same time. When a new ticket is entered in the database the ticket table is updated with the following information:

| | |
|---|---|
| ticket_id | Unique id for the ticket assigned by the database when the entry is made. |
| card_id | The card_id to which the ticket is attached. |
| uri | The service that is being bought |
| start | The start time of the service |
| duration | The duration for which the ticket is valid |
| rate | The cost of the service |
| charge_type | The type of charge applied, generally a ticket |

When a card is first put in a unit the following information is put in the database in the card table:

| | |
|---|---|
| card_id | The unique ID of the card |
| date_first_used | The data and time of the card was first entered into the bedside terminal. | and an entry is made in the card_user table:

| | |
|---|---|
| card_id | The unique ID of the card |
| user_id | A unique ID for the user of the card assigned by the database. | and an entry is made in the bed_user table:

| | |
|---|---|
| bed_id | A bed ID as defined when a terminal is commissioned and input at that point into the database |
| user_id | A unique ID for the user of the card assigned by the database. |

When a card is taken from one terminal to another the bed_user table is updated to match the new information.

The user table holds data that is associated with the user_id that may be requested from a user directly as a registration exercise at first use of a smartcard in a bedside terminal or by cross referenced from other hospital systems like checkin and checkout data (this is not implemented yet). The user table holds the following data:

| | |
|---|---|
| user_id | The database primary key for a user as described and assigned above. |
| surname | Surname of a patient. |
| forename | Forename of a patient |
| date_of_birth | Date of birth of a patient. |
| date_of_registration | Date the user was first registered in the database. |
| do_not_disturb | A flag to indicate that a patient should not be disturbed |
| busy | The patient is busy, not used. |
| parental_guidance | Classification of the patient for service delivery. |

-continued

| | |
|---|---|
| pin_number | Not used in this embodiment. |
| ddi_number | The analog or digital telephone number and extension for the user. |
| gone_home | Notification that the patient is no longer in the hospital. |

The database also has an "Old ticket table", tickets are relegated to this table when they are no longer valid. This is done once a day by a script on the server that runs at 3:50 am. This provides a clear view of valid tickets when looking at a view of ticket table.

Middleware Engine Operation

The middleware engine executing on the servers 15 and the terminals 2 and the vending machines 16 performs the operations described above for providing services.

A user registration with the system 1 is automatically terminated when the card is returned to a vending machine 16. When the user inserts the card for return of a deposit, a middleware function on the vending machine automatically generates a notification for the functions executing on the server 15. These functions update the user profile database to indicate that the user is terminated on the system 1. If the card is not returned by the user, an administration user having administration security access performs this update. Alternatively, a middleware function on the server 15 automatically terminates users according to polling of the external medical databases to retrieve data concerning patients who have left the hospital.

Figure 4:
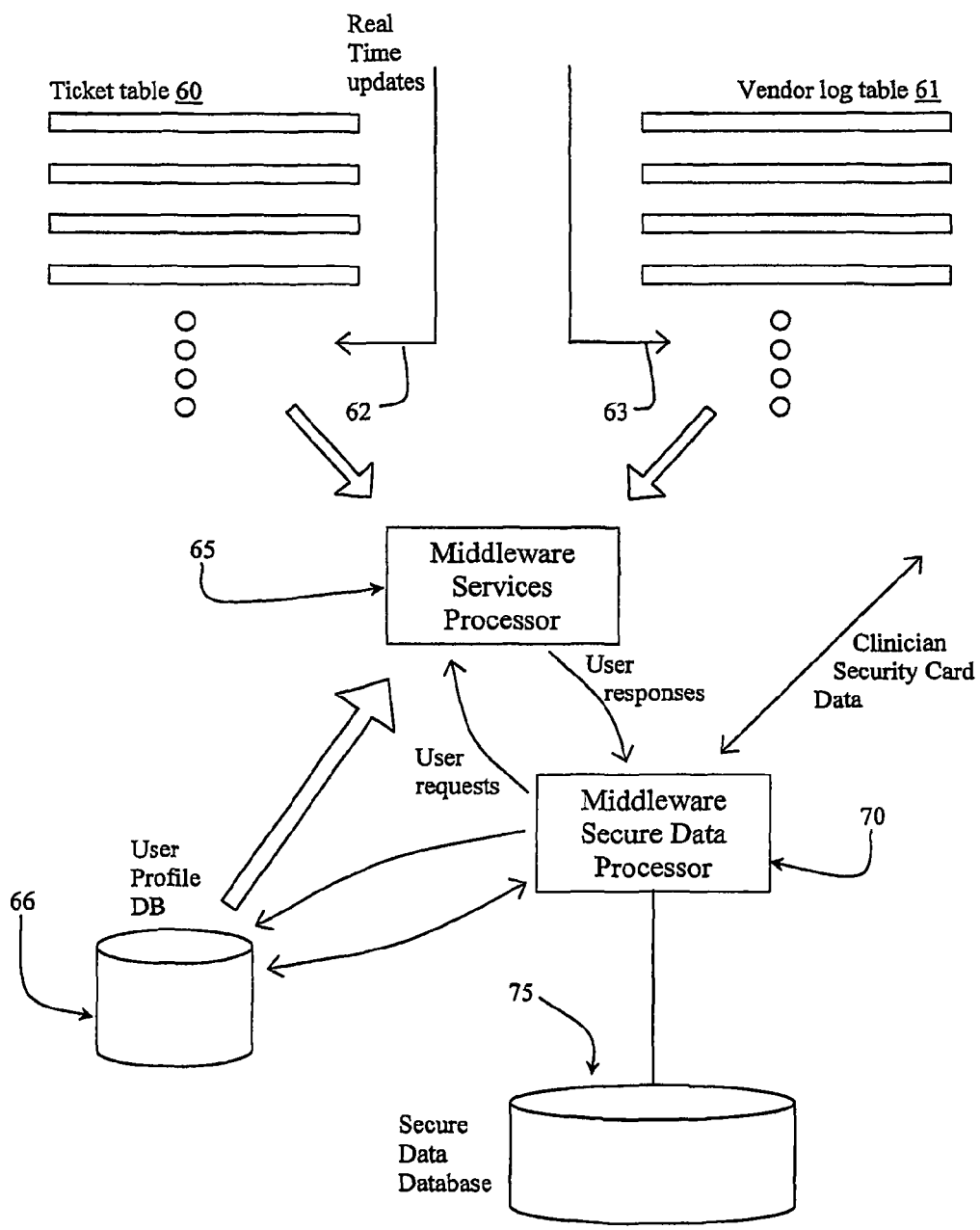
FIG. 4 is a flow diagram illustrating components of a middleware engine of the system and how they operate.

The system 1 also operates to allow clinicians to access medial records using the terminals 2. FIG. 4 illustrates an overview. As described above there is real time updating, indicated by the arrows 62 and 63, of the ticket table (60 in this drawing) and the vendor log table (61 in this drawing) as transactions take place. The link between these tables is the card identifier, as this uniquely identifies the user. The user table (66 in this drawing) is relatively static, storing the user profile. The middleware engine, at a general level, comprises a services processor 65 and a secure data processor 70. Synchronized operation of the processors 65 and 70 allow the terminals 2 to be used for the diverse tasks of providing entertainment and information management services to the users, such as TV, radio, internet access, or video games as described above. Clearly, data updating by a clinician such as a doctor or a nurse, is very different. The system 1 achieves such joint use by the services processor 65 accessing the tables including the tables 60, 61, and 66 and executing the status update "termon" programs. The secure data processor 70 operates independently to access secure high-data-security medical records 75 on external databases, which records are not accessible to the services processor 65. However, there is overall synchronisation because the secure data processor 70 interacts with the services processor 65 to fetch user profile data from the table 66. The security for clinician access is driven by a clinician security card being inserted in the terminal, and the processor 70 performing access control operations on the basis of this card access and also inputting of security codes. Again, this is independent of the user access control operations. Thus, while the same terminal is used for inputting data and the same database tables provide user profile data, the data updating and access control operations are independent.

It will be appreciated that the invention provides a system for comprehensive provision of information management and entertainment services in real time despite the complexity of having transient users and disparate uses involving highly confidential data access and entertainment provision.

The invention is not limited to the embodiments described but may be varied in construction and detail. For example, the system may be used for applications other than hospitals, such as nursing homes or hotels. Also, the system may not include card vending machines, an all terminal authentication may be by way of inputted security codes or biometrics. In this case the users may be billed by the server, such as when leaving.

The invention claimed is:

1. An information management and entertainment system comprising a plurality of user terminals, and a switching system having interfaces for receiving media streams and for routing the streams to the terminals, wherein:

the switching system comprises a core switch;

the terminals are connected to the core switch by edge switches;

the system comprises at least one management server connected to the core switch and being adapted to route for control signals to components of the system, the core switch and the management server are adapted for bi-directional communication, and the management server is adapted to transmit control signals to the core switch, the management server and the terminals execute a middleware engine for communication within the system, and the middleware engine comprises a services processor executing on the management server and functions executing on the terminals for controlling provision of information management and entertainment services to users via the terminals, wherein the middleware engine services processor automatically maintains a transaction database in a database server, each record of which relates to a user service transaction, wherein the middleware engine comprises a secure data processor having a function on each terminal for authorizing access by a person having high-security access, and functions executing on the management server for allowing access to high-security data upon authorization by a terminal, wherein said secure data processor is adapted to limit high-security data access to database records associated with a user linked with the terminal which receives the high-security data access request, wherein the secure data processor is adapted to determine said linking by verifying an association between a user and a terminal, and wherein said verification is performed by reference to the user profile database, wherein the services processor comprises update functions executing on the terminals and said update functions automatically transmit live status updates to services processor functions executing on the server, and said functions log the updates; and wherein the updates are triggered according to time and according to service transaction events; and wherein the server-executing functions automatically parse the updates to determine update data and wherein server-executing functions use the updates to verify user-requested transactions.

2. The information management and entertainment system as claimed in claim 1, wherein:
the system further comprises at least one vending machine for vending user cards for usage of services,
the vending machine writes a unique user identifier to each card,
each terminal comprises a card reader, and
the terminal middleware functions receive and validate a card and allow provision of services upon validation of a card.

3. The information management and entertainment system as claimed in claim 2, wherein the services processor automatically accesses data in an external database to verify a card.

4. The information management and entertainment system as claimed in claim 2, wherein the terminal middleware functions allow provision of services up to a limit set by a credit amount read from a card.

5. The information management and entertainment system as claimed in claim 2, wherein the vending machine writes the user identifier comprising a component having a card factory-set identifier and a component freshly-generated upon issuance of the card.

6. The information management and entertainment system as claimed in claim 2, wherein the vending machine writes the user identifier comprising a component having a card factory-set identifier and a component freshly-generated upon issuance of the card; and wherein the freshly-generated component is a value which is incremented from a previous value, and said value is not used again by the system.

7. The information management and entertainment system as claimed in claim 2, wherein the vending machine comprises a receiver for receiving used cards, and a card issuer for re-issuing said cards with a different user identifiers.

8. The information management and entertainment system as claimed in claim 2, wherein: the vending machine comprises a receiver for receiving used cards, and a card issuer for re-issuing said cards with different user identifiers; and wherein the services processor automatically terminates a user on the system upon return of the user's card.

9. The information management and entertainment system as claimed in claim 2 wherein: the vending machine comprises a receiver for receiving used cards, and a card issuer for re-issuing said cards with different user identifiers; and wherein the services processor automatically terminates a user on the system upon return of the user's card; and wherein the services processor automatically terminates a user upon polling an external database of user data and if said external database indicates that the user should be terminated.

10. The information management and entertainment system as claimed in claim 1, wherein the middleware engine services processor comprises a function executing on each terminal for validating a presented card, functions executing on the server and on the terminal for prompting input of user profile data to establish a user profile upon first presentation of a card, and middleware engine server functions identify the user by the card identifier.

11. The information management and entertainment system as claimed in claim 1, each record of the vendor log database relates to a transaction involving a card vending machine, including a credit amount read from the card.

12. The information management and entertainment system as claimed in claim 1, wherein the middleware engine services processor automatically maintains a vendor log database, each record of which relates to a transaction involving a card vending machine, including a credit amount read from the card; and wherein the middleware engine services processor dynamically manages service provision to the terminals according to real time updating of the transaction and vendor log databases, writing of fresh records to these databases allowing provision of fresh services after validation by the middleware engine with reference to the user profile database.

13. The information management and entertainment system as claimed in claim 1, wherein the secure data processor validates a high-security card presented to a card reader in the terminal.

14. The information management and entertainment system as claimed in claim 2, wherein the services processor comprises update functions executing on the terminals and on the vending machines, and said update functions automatically transmit live status updates to services processor functions executing on the server, and said functions log the updates.

15. The information management and entertainment system as claimed in claim 1, wherein the services processor functions communicate within the system using the http protocol.

16. The information management and entertainment system as claimed in claim 1, wherein the switching system comprises a local area network core switch and local area network edge switches linked with the terminals.

17. The information management and entertainment system as claimed in claim 1, wherein the switching system comprises a local area network core switch and local area network edge switches linked with the terminals; and wherein the local area network core switch is connected to a TV head-end, in turn linked with broadcast networks, and said core switch is also connected to a VoIP gateway.

18. The information management and entertainment system as claimed in claim 1, wherein the switching system comprises a local area network core switch and local area network edge switches linked with the terminals; and wherein the local area network core switch is connected to a TV head-end, in turn linked with broadcast networks, and said core switch is also connected to a VoIP gateway; and wherein the VoIP gateway is connected to an integrated voice response system.

19. A non-transitory computer readable medium comprising software code for performing operations of a middleware engine of a system of claim 1 when executing on a digital processor.

* * * * *